July 10, 1956 — E. F. CHAUDIERE — 2,754,041
IMPROVEMENTS IN TOP LUGGAGE CARRIERS FOR MOTORCARS
Filed June 26, 1951 — 3 Sheets-Sheet 1

Inventor
Etienne F. Chaudiere
By Young, Emery & Thompson
Attys.

July 10, 1956  E. F. CHAUDIERE  2,754,041
IMPROVEMENTS IN TOP LUGGAGE CARRIERS FOR MOTORCARS
Filed June 26, 1951  3 Sheets-Sheet 2
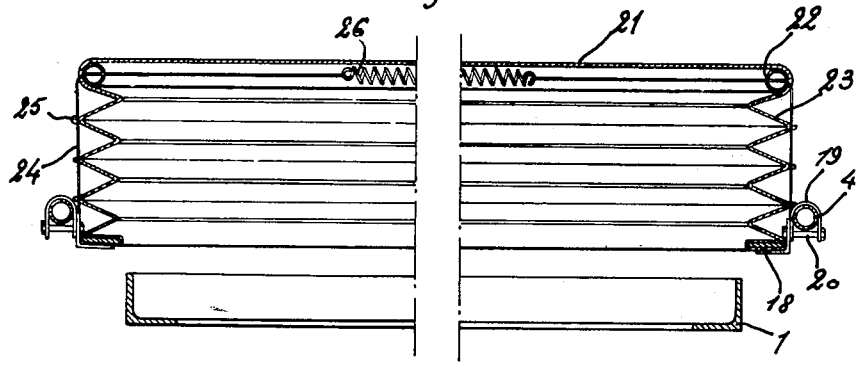
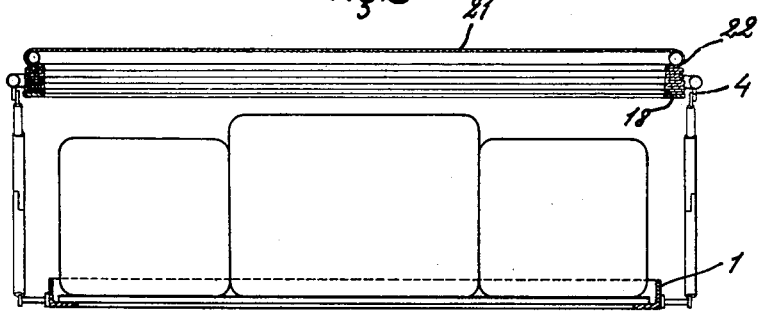
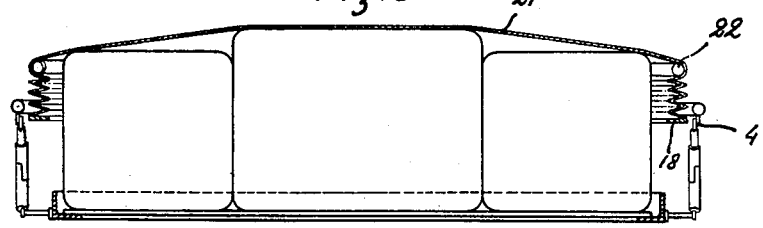
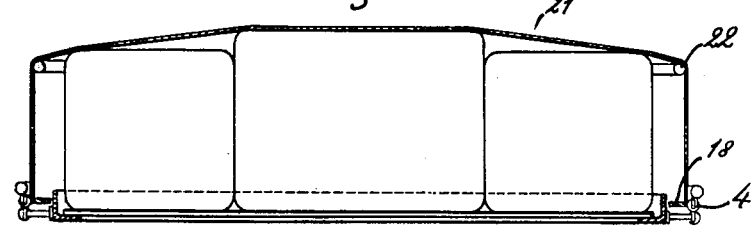
Inventor
Etienne F. Chaudiere
By Young, Emery & Thompson
Attys.

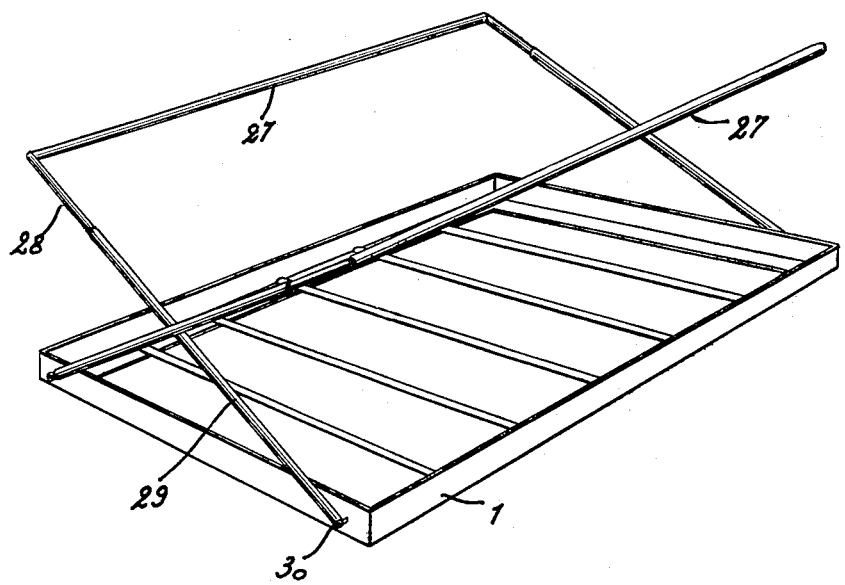
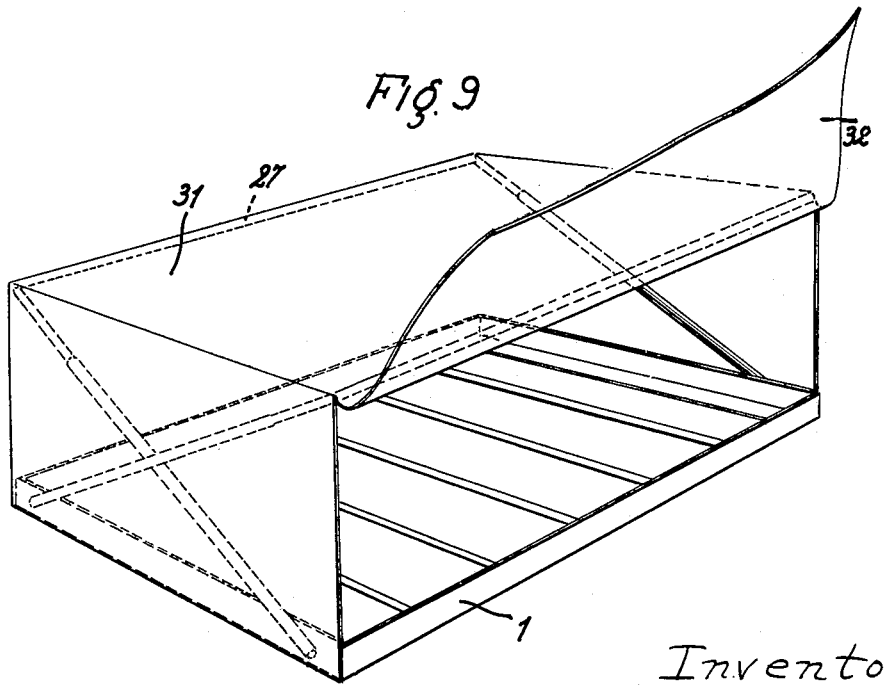

United States Patent Office 2,754,041
Patented July 10, 1956

2,754,041

IMPROVEMENTS IN TOP LUGGAGE CARRIERS FOR MOTORCARS

Etienne François Chaudiere, Paris, France, assignor to J. A. M., S. A., Courbevoie, France, a corporation of France Application June 26, 1951, Serial No. 233,643

Claims priority, application France July 4, 1950

4 Claims. (Cl. 224—42.1)

My invention is connected with luggage carriers mounted on the roof of motorcars. As heretofore constructed such luggage carriers show certain drawbacks; they include, as a matter of fact, a base secured onto the roof of the vehicle and a railing at a predetermined height to prevent the luggage from falling off, and said height, although it is comparatively moderate, is still too high when there is no luggage to be carried, while it is often too low for standard sized luggage. It is, therefore, necessary to tie the latter securely to the railing. If it is desired to protect the pieces of luggage against dust and rain, it is necessary to cover them with a tarpaulin and the laying of a stretched tarpaulin over the luggage and the securing thereof forms always a delicate operation and in the case of a motorbus it is particularly tedious and difficult.

My invention has for its object an improved top luggage carrier that provides on one hand an efficient keeping of pieces of luggage of variable sizes while, on the other hand, it is possible to cover them completely with a tarpaulin through a very simple easy operation.

According to my invention my improved luggage carrier comprises in combination with a flat stationary frame adapted to be secured to the roof of the motor car or the like vehicle, horizontal bars connected with said stationary frame through a pivotal linkage adapted to expand and to be urged elastically upwardly substantially in register with two parallel sides of the frame, said bars forming a protective railing for the pieces of luggage and being adapted to serve as a support for the tarpaulin that is to cover said pieces of luggage.

These bars that are thus vertically shiftable may be independent of one another or else form part of a movable frame. The tarpaulin sewn into a parallelopipedic shape having an open lower surface may be secured permanently to said upwardly shiftable bars or to the frame formed by the latter or else it may be inserted permanently in a removable frame. The tarpaulin may be laid by raising the bars or the frame constituted by the latter, which operation lifts the upper surface of the tarpaulin, three depending lateral faces of which are secured through their lower sides to the stationary frame along corresponding sides thereof while the fourth depending lateral face of the tarpaulin forms a flap connected only with the upper surface of the latter. In a modification, the lower sides of the lateral faces of the tarpaulin sewn into parallelopipedic shape may be secured to the movable frame, the lowering of which unfolds the lateral faces of the tarpaulin while the upper surface of said tarpaulin remains in position on the luggage that forms a bearing therefor.

I will now describe by way of example and by no means in a binding sense, various embodiments of a luggage carrier according to my invention that may be associated with a tarpaulin or otherwise, reference being made to the accompanying drawings, wherein:

Fig. 4 is a cross-sectional view showing the luggage carrier with its movable frame carrying a tarpaulin according to the invention.

Figs. 5, 6 and 7 are views in longitudinal cross section illustrating various steps in the covering of the luggage with a tarpaulin.

Fig. 8 is a perspective view of a luggage carrier including two horizontal vertically shiftable bars forming a modification of the embodiment illustrated in Fig. 1.

Fig. 9 is a perspective view showing the arrangement of Fig. 8 provided with a tarpaulin.

Figure 1:
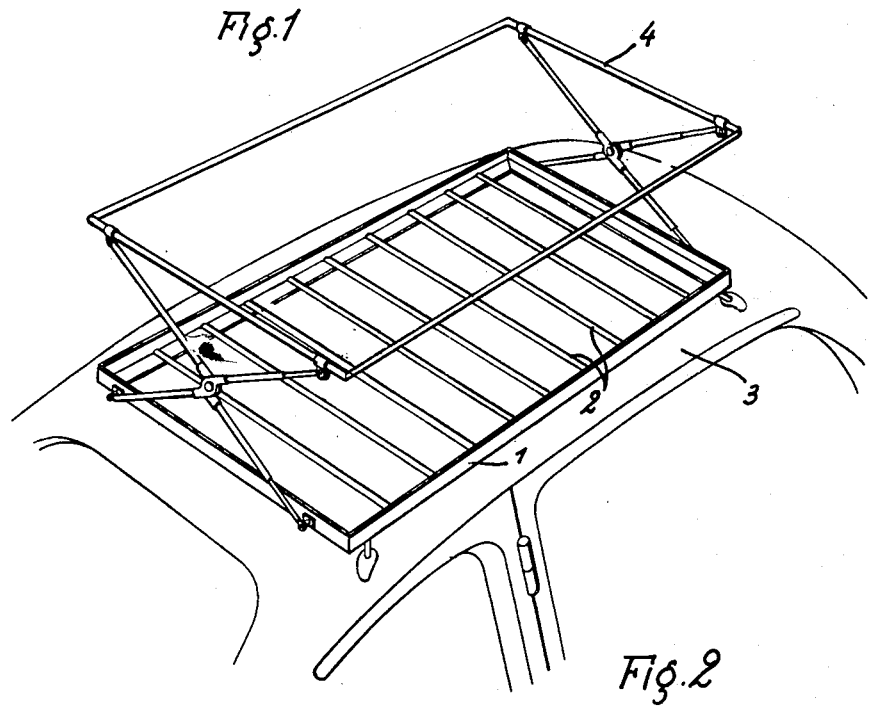
Fig. 1 is a perspective view of a complete luggage carrier provided with a movable frame according to my invention as positioned on the roof of a motor car.

In the embodiment illustrated in Fig. 1, the luggage carrier includes as a stationary part a low metal frame made of angle irons 1 associated with transverse bars 2 to form a base on which the luggage is carried, said metal frame being secured to the roof 3 of the vehicle.

A movable frame of large area made of welded tubes 4 is connected with the frame 1 at least to the front and to the rear thereof. The means for connecting the frame 4 with the frame 1 comprise two connecting rods crossing each other, as clearly apparent from Fig. 2; the connecting rods at each end of the luggage carrier are pivotally secured together at their crossing point, each of them being pivoted through one end to the stationary frame and through the other end to the movable frame.

Figure 3:
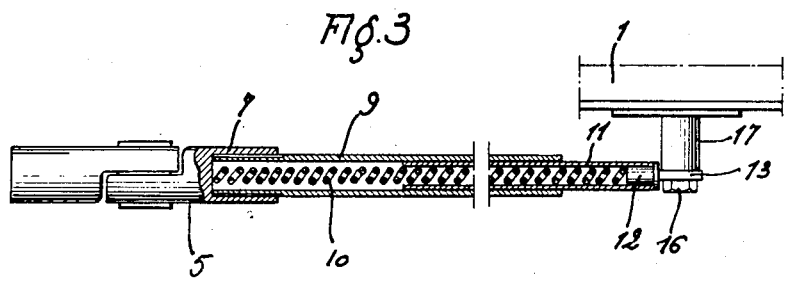
Fig. 3 is a detail view showing cross-sectionally a telescopic arm forming part of the linkage.

In order to constrain the connecting rods to lie in the same plane, the pivotal connection between the said rods may be constituted by two members 5 including each a central arcuate part, the two interengaging arcuate parts carrying a pivot 6 and being rigid each with two tubular sockets 7 the directions of which are opposed; the tubular sockets of the members 5 are shifted transversely from one member 5 to the other by a distance equal to their diameter so as to lie all in the same vertical plane when the two members 5 have their central parts registering. Each connecting rod includes two tubular link arms fitted in the opposite sockets of the corresponding connecting member 5 respectively. The link 8 to one side of a longitudinal plane passing through the frames assumes a constant length while the other link is telescopic as illustrated in Fig. 3 and includes a tube 9 engaging a pivotal tube 11 containing a spring 10 that urges outwardly said inner tube 11. The outer ends of the links forming the associated connecting rods are pivotally secured to the stationary frame 1 and to the upper movable frame 4 respectively, as provided through terminal studs or the like members 12 the outer ends of which are flat, and are pivotally secured through a bolt 14 to a lug 15 rigid with the upper movable frame 4 or through a screw 16 locking the stud over a boss 17 rigid with the stationary frame 1, as the case may be.

The upper movable frame thus secured collapsibly to the lower stationary frame 1 may be raised or lowered through actuation on one side only of the frames. When lowered, the movable frame lies in the same plane as the stationary frame on the outside thereof. When it is desired to raise the movable frame 4, it is sufficient to exert an upwardly directed thrust on one of its ends in order to constrain said frame 4 to rise while remaining parallel to the stationary frame, by reason of the connecting rods on the opposite side of the frames opening in the same manner as those that are being actuated. Obviously, the pivotal connection 6 between the connecting rods inserted between the stationary and the movable frames, and including arms 8 having a constant length, on one side of the longitudinal vertical middle plane through the frames, describes an arcuate path (Fig. 2)

having its center at the pivot of the lower rigid link 8 on the stationary frame. The two telescopic links 9—11 increase in length gradually as the movable frame 4 rises.

Figure 2:
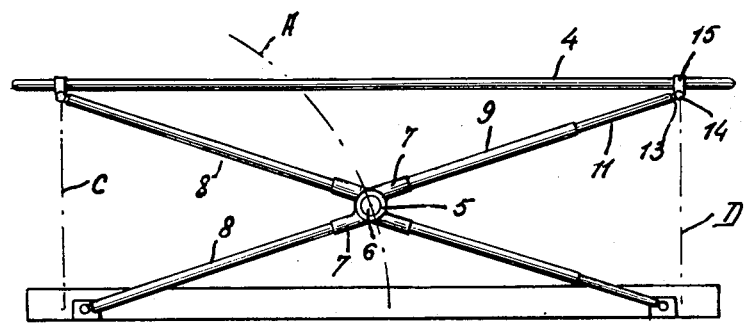
Fig. 2 is an endwise view showing the controlling linkage in elevational view in the position for which the movable frame is raised.

Fig. 2 shows that the paths C and D of the points of connection of the movable frame with the crossed rod system are substantially vertical within the range of the normal rising and sinking movements of the movable frame, which latter is illustrated in solid lines in its normal upper position. Beyond said position, the frame would assume a lateral tilt. The movable frame remains stable in the position assumed by it by reason of the clamping exerted on its pivotal connections. It is also possible to provide for the locking of the latter, one of the screws 16 may be substituted by a threaded rod engaged by a winged nut.

It is apparent that it is possible thus to arrange the carrier frame to suit the proper height for the luggage forming said load. But the arrangement may also be used for positioning a tarpaulin enclosing the load, holding it on the stationary frame and protecting it against dust and rain. To this end, I resort to a tarpaulin sewn into the shape of a parallelopiped having its lower surface open, and the size of which is sufficient for it to enclose the luggage, starting from the highest level to be considered for the load down to the stationary frame. Said tarpaulin may be sewn along the sides of its lower open surface to the bars of the movable frame, but for sake of convenience, it is possible to sew the tarpaulin in the same manner to a removable auxiliary frame that may in its turn be removably secured to said bars.

This arrangement is illustrated in Fig. 4. The auxiliary frame 18 is constituted by flat irons and carries on both sides lugs 19 assuming the shape of hooks that allow suspending it to the two opposite bars of the movable frame 4. The auxiliary frame is then secured through bolts 20 passing through the two ends of the hooks. The parallelopipedic tarpaulin 21 is sewn along the sides of its lower open surface around the corresponding sides of the auxiliary frame 18. Furthermore, the sides of its upper surface are sewn, without substantially stretching this surface, to an independent frame or drum 22. The depending portions of the tarpaulin forming the lateral faces of the parallelopiped are folded into parallel folds 23 collapsed over the flat sides of the auxiliary frame 18. In order to make its folding easier, it is possible to provide, transversely of the frames, a frame drawing cable 24 attached through its ends to said auxiliary frame 18 and passing through outer rings or loops 25 sewn to the projecting edges of the folds of the tarpaulin, a traction spring being inserted at 26 in the intermediary portion of said cable.

When it is desired to place the luggage in position, the movable frame 4 is raised and lifts with it the auxiliary frame 18, the tarpaulin itself and the independent drum or frame 22 (Fig. 5).

The luggage having been suitably positioned on the luggage carrier, the movable frame is lowered again down to the level of the stationary frame. The upper surface of the tarpaulin engages first the upper surface of the luggage and the independent frame 22 is thus held in position, the folds of the tarpaulin are gradually undone as shown in Fig. 6 and enclose the load completely when the movable frame 4 has dropped into the plane of the stationary frame on the outside thereof (see Fig. 7). The connecting rods are then collapsed in super position while the luggage that is completely enclosed is securely held on the luggage carrier. It is possible, if desired, to lock through catches the movable frame in its lower position.

Obviously, the upwardly shiftable bars forming the sides of the above mentioned movable frame and to which the lower sides of the lateral faces of the tarpaulin may be secured, may be connected with the stationary frame through expansible rods of a type different from the type described that corresponds only to a preferred embodiment.

It is also possible to provide independent bars instead of a complete frame 4 in which case their number is reduced to two, corresponding to two opposite sides of the precedingly described movable frame. Such a modification is illustrated in Figs. 8 and 9. The two bars 27 shown thereon correspond to the sides of the movable frame comprised between the ends of this frame that were pivotally connected with the connecting rods in the first described embodiment. The connecting rods 28 that are again of a telescopic nature are connected directly with the ends of the bars 27 and are independent of one another. Each bar 27 may be bent at its ends to form two legs 28 slidingly engaging the tubes 29 forming the main portions of the connecting rods and pivotally secured at their outer ends to the stationary frame 1; the expansion of the connecting rods thus formed by the tubes 29 and the legs 28 of the bar 27 sliding therein, is provided as in Fig. 3 by inner springs.

It is thus possible to form a railing for the packages on the luggage carrier by merely raising the bars 27 to the desired level, said bars being then held in place by the luggage fastening straps.

The vertically shiftable bars 27 may be used as in the precedingly described embodiment for the positioning of a tarpaulin. For this purpose, it is sufficient to secure to said bars an intermediary frame 18 serving as a tarpaulin carrier as described with reference to Fig. 4.

It is also possible in a simplified embodiment to use the bars 27 for carrying a tarpaulin in a somewhat different manner as illustrated in the modification shown in Fig. 9. In this case, the tarpaulin 31 is sewn as precedingly into the shape of a parallelopiped the lower surface of which is open while it rests through its upper surface on the bars 27. One of the lateral faces 32 forms, however, a free flap that it is possible to raise in order to provide a lateral entrance for the luggage, the other lateral faces of the tarpaulin being secured through their lower sides to the corresponding sides of the stationary frame 1. The two sides of the upper surface of the tarpaulin registering with the bars 27 are sewn to the latter.

It is apparent that the luggage carrier, when not in use, may be folded over the stationary frame, through the successive lowering of the bars 27 while it may be raised into operative position through the reverse operation. The lateral faces of the tarpaulin depending from the bars 27 assume parallel folds when the tarpaulin is collapsed while the other transverse surfaces assume an accordion shape or are stretched according as to whether the bars 27 are lowered or raised. The formation of the folds may be controlled by an elastic traction-operating cable that is similar to that described with reference to Fig. 4. The folded flap 32 may be held in its luggage covering position through press-buttons carried by the sides of the two adjacent lateral faces of the tarpaulin. The operation of the connecting rods is quite similar to that disclosed with reference to the case of a movable frame as the upper surface of the tarpaulin holds the bars 27 spaced at a maximum spacing and constrains the connecting rods to remain in the angular position given to them. This arrangement is of particular interest by reason of its simplicity.

Although the particular embodiment and the arrangement of the various parts of the luggage carrier in the embodiments described and illustrated are to be preferred, obviously they are not essential for the execution of the invention except insofar as they are included in the following claims.

What I claim is:

1. In a luggage carrier the combination according to claim 3, comprising further for each of two opposed side walls of said tarpaulin a number of rings sewn at the external folding points of the lateral edges of said side walls, two cables attached by one end to the lower ends of said edges and passed through said rings and a traction spring connecting the other ends of said cables.

2. A luggage carrier comprising in combination, a stationary rectangular frame adapted to be mounted on top of the vehicle to carry luggage, a movable frame substantially superposable by its related sides to said stationary frame and adapted to be moved vertically with respect to said stationary frame, on opposite sides of the carrier two pairs of associated crossed connecting rods between both said frames, said rods associated by pairs having a pivotal connection between each other at their crossing point and oppositely directed arms of constant length on one side of a vertical line through said pivotal connection and telescopic on the other side and being pivotally connected at their ends to two related sides of said frames, and a tarpaulin sewn into the shape of a parallelopiped, having a top, collapsible side walls and an open bottom, and means for securing the lower portions of the side walls to the movable frame.

3. In a luggage carrier having a stationary rectangular frame adapted to be mounted on the top of a vehicle to carry luggage, in combination with said frame, a movable frame of substantially the same dimensions as said stationary frame, expansible means connecting said frames and adapted for vertical movement of said movable frame with respect to said stationary frame, and a tarpaulin sewn into the shape of a parallelopiped, having collapsible side walls, an open bottom and a top of sufficient weight to collapse the side walls, means for securing the lower portions of the side walls to the movable frame and movable therewith whereby the movable frame may be moved upwardly to raise it and the tarpaulin above the stationary frame to enable luggage to be inserted between the frames, then lowered until the top of the tarpaulin is supported by the luggage, and further lowered to expand the collapsible side walls to enclose the luggage.

4. In a luggage carrier, the combination according to claim 3, comprising further an additional frame to which the edges of the top of said tarpaulin are sewn.

References Cited in the file of this patent

UNITED STATES PATENTS

| 1,390,137 | King | Sept. 6, 1921 |
| 2,222,636 | Strauss | Nov. 26, 1940 |
| 2,440,821 | Godwin | May 4, 1948 |
| 2,496,085 | Engelheart | Jan. 31, 1950 |

FOREIGN PATENTS

| 344,982 | Italy | Dec. 5, 1936 |
| 938,130 | France | Mar. 30, 1948 |